(12) United States Patent
Ringdahl (10) Patent No.: US 11,553,034 B2
(45) Date of Patent: *Jan. 10, 2023

(54) SERVER COMPUTER MANAGEMENT SYSTEM FOR SUPPORTING HIGHLY AVAILABLE VIRTUAL DESKTOPS OF MULTIPLE DIFFERENT TENANTS

(71) Applicant: VMware, Inc., Palo Alto, CA (US)

(72) Inventor: Kenneth N. Ringdahl, Salem, NH (US)

(73) Assignee: VMware, Inc., Palo Alto, CA (US)

( * ) Notice: Subject to any disclaimer, the term of this patent is extended or adjusted under 35 U.S.C. 154(b) by 348 days.

This patent is subject to a terminal disclaimer.

(21) Appl. No.: 16/998,967

(22) Filed: Aug. 20, 2020

(65) Prior Publication Data

US 2020/0382579 A1 Dec. 3, 2020

Related U.S. Application Data (63) Continuation of application No. 15/190,271, filed on Jun. 23, 2016, now Pat. No. 10,778,750.

(51) Int. Cl.
*G06F 9/451* (2018.01)
*G06F 9/50* (2006.01)
(Continued)

(52) U.S. Cl.
CPC .............. *H04L 67/10* (2013.01); *G06F 9/452* (2018.02); *G06F 9/45558* (2013.01); *G06F 9/5072* (2013.01); *G06F 9/5077* (2013.01); *G06F 2009/45583* (2013.01); *G06F 2009/45595* (2013.01)

(58) Field of Classification Search
CPC ........... G06F 2009/45595; G06F 9/452; G06F 9/45558; G06F 2009/45583
See application file for complete search history.

(56) References Cited

U.S. PATENT DOCUMENTS 7,484,208 B1 1/2009 Nelson
8,065,676 B1 * 11/2011 Sahai .................... G06F 9/5077
718/1

(Continued)

OTHER PUBLICATIONS

PCT International Search Report and Written Opinion in International Appln. No. PCT/US2017/038775, dated Oct. 25, 2017.

*Primary Examiner* — William G Trost, IV
*Assistant Examiner* — Adam A Cooney
(74) *Attorney, Agent, or Firm* — Dinsmore & Shohl LLP (57) ABSTRACT

A server computer can be quickly allocated to and made ready for use by users of a tenant by adding and starting, on that server computer, copies of a process implementing the tenant's virtual machine, based on a gold image virtual machine for that tenant. The gold image virtual machine also has an associated gold image virtual disk. The virtual machines on the server computer are associated with virtual disks that are linked clones based on the gold image virtual disk, such as linked clones of a replica of the gold image virtual disk. Each virtual machine for a tenant on the new server computer also is added to the tenant computer network. Server computers for multiple tenants can be grouped into a cluster, and can use anti-affinity rules to limit instantiation of virtual machines of each tenant only on server computers dedicated to the tenant.

21 Claims, 8 Drawing Sheets (51) Int. Cl.
G06F 9/455 (2018.01)
H04L 67/10 (2022.01)

(56) References Cited

U.S. PATENT DOCUMENTS

| | | |
|---|---|---|
| 8,239,646 B2 | 8/2012 | Colbert et al. |
| 8,706,991 B2 | 4/2014 | Colbert et al. |
| 9,189,342 B1 | 11/2015 | von Thenen et al. |
| 9,323,565 B2 | 4/2016 | Li et al. |
| 9,329,889 B2 | 5/2016 | Lin et al. |
| 10,313,261 B1 * | 6/2019 | Walton, III .......... G06F 9/5066 |
| 2013/0086579 A1 | 4/2013 | Venkat et al. |
| 2014/0330936 A1 * | 11/2014 | Factor ................ H04L 63/0281 |
| | | 709/219 |
| 2014/0372553 A1 | 12/2014 | Blackburn et al. |
| 2015/0058969 A1 | 2/2015 | Ringdahl et al. |
| 2015/0074054 A1 * | 3/2015 | Antony ................ G06F 16/128 |
| | | 707/639 |
| 2015/0135003 A1 | 5/2015 | Cota-Robles et al. |
| 2015/0178108 A1 | 6/2015 | Tarasuk-Levin et al. |
| 2015/0178109 A1 | 6/2015 | Li et al. |
| 2015/0178110 A1 | 6/2015 | Li et al. |
| 2015/0256474 A1 * | 9/2015 | Ringdahl ................ G06F 9/46 |
| | | 709/226 |
| 2015/0378766 A1 | 12/2015 | Beveridge et al. |
| 2016/0055016 A1 * | 2/2016 | Beveridge ............ G06F 9/4451 |
| | | 718/1 |
| 2016/0055021 A1 | 2/2016 | Beveridge et al. |
| 2016/0170788 A1 | 6/2016 | Tarasuk-Levin et al. |
| 2016/0217001 A1 | 7/2016 | Li et al. |
| 2016/0232025 A1 * | 8/2016 | Speak ................ G06F 9/45533 |
| 2016/0274948 A1 | 9/2016 | Kelly et al. |
| 2017/0185437 A1 * | 6/2017 | Thomas ................ G06F 9/5061 |

* cited by examiner

FIG.1

Desktop Manager - 200
    desktop model - 202
    list of servers - 204
    server capacity - 206
    server utilization - 208

FIG.2

Server computer pool - 300
[List of server computers]
Server computer 1
    server computer ID - 302
    desktop model - 304
    other data -- 306
...
Server computer N

FIG.3

Tenant data - 400
    list of users - 402
    quota - 406
    current usage - 408
    other tenant data - 410

SERVER COMPUTER MANAGEMENT SYSTEM FOR SUPPORTING HIGHLY AVAILABLE VIRTUAL DESKTOPS OF MULTIPLE DIFFERENT TENANTS

CROSS-REFERENCE TO RELATED APPLICATIONS

This application is a continuation application of, and claims priority to, U.S. patent application Ser. No. 15/190,271, entitled "SERVER COMPUTER MANAGEMENT SYSTEM FOR SUPPORTING HIGHLY AVAILABLE VIRTUAL DESKTOPS OF MULTIPLE DIFFERENT TENANTS", filed on Jun. 23, 2016. The disclosure of the foregoing application is incorporated here by reference.

BACKGROUND

A virtual desktop is a combination of computing resources, such as processor, memory, storage and computer network access, and computer programs running on such resources, which is remotely accessed by a user from a remote device. Such computer programs typically include an operating system, and one or more applications running on the computer that utilize the computer resources as managed by the operating system. The remote device provides an input and output interface between an individual user and the virtual desktop. The remote device communicates inputs to the virtual desktop and receives display information from the virtual desktop for display on the remote device over a computer network. An application is used on the remote device to connect to the virtual desktop.

A service provider can provide virtual desktops as a service to multiple customers, also called tenants. The service provider generally maintains one or more data centers. A data center is a location that houses multiple server computers on which virtual desktops are implemented. A tenant typically is an enterprise that has multiple users. Each user typically has a set of applications and resources based on a classification of the user. The service provider manages the server computers so as to provision sets of virtual desktops on its server computers for use by the users of each tenant.

Generally speaking, the service provider desires to isolate its customers from selection and management of hardware configurations, i.e., server computers, used to support the customers' virtual desktops, yet the service provider can operate more profitably by efficiently deploying its resources of server computers to its tenants. One part of efficient deployment is instantiating actual server computers for use by a tenant only when the tenant is actually likely to use those resources.

Instantiating a server computer for use by a tenant involves installing the computer programs, such as the operating system, file system and application programs, licensed by that tenant for use by its users. The license terms for such computer programs can restrict a service provider from sharing computer programs or computing resources among multiple tenants. As an example restriction, the service provider may not be allowed to permit two tenants to run separate instances of a licensed computer program on different processors or processor cores on the same server computer at the same time. Other considerations, such as tenant request, or design or performance considerations, may restrict the ability or desire of a service provider to run separate instances of a licensed computer program, for different tenants, on different processors or processor cores on the same server computer at the same time. For example, some tenants may require that its users not use computing resources on a server computer that has computing resources being used at the same time by other tenants. As another example, performance of a server computer during use of some its computing resources by one tenant might degrade due to simultaneous use of other computer resources on the same server computer by another tenant.

When a service provider provides virtual desktops as a service to multiple tenants, it is generally expected that the computing resources will have high availability. High availability generally involves having additional backup computing resources ready to take over processing from other computing resources in the event of a failure. Limitations against sharing resources among multiple tenants also can impact resource utilization when high availability is supported.

SUMMARY

This Summary briefly introduces some concepts that are further described below in the Detailed Description. This Summary is intended neither to identify key or essential features of the claimed subject matter, nor to limit the scope of the claimed subject matter.

To address conditions limiting simultaneous use of a server computer by multiple tenants, a computer system is provided in which tenants can share a server computer in a way in which the server computer is dedicated to a single tenant at any given point in time. While it is possible for a service provider to allocate server computer resources in such a manner to tenants based on expected likely usage, dynamic addition or reassignment of a generic server computer to a pool of server computers configured for a particular tenant presumes an ability to quickly provision, activate and instantiate virtual desktops configured for that tenant on that generic server computer. To do so involves installing an operating system, including a file system, and applications for the tenant, and configuring that operating system to a computer network and storage devices for the tenant. Many operating system and application installation procedures can take several hours and can involve rebooting a server computer several times before the server computer can be available to provide a virtual desktop that can be assigned to a particular user for that tenant.

In such a system, high availability of server computer resources also can be provided. For example, high availability can be provided, in part, by having one or more additional server computers allocated for a tenant beyond that tenant's projected use. For example, if a tenant is projected to use fifteen server computers, an additional server computer can be allocated for that tenant, thus resulting in an allocation of sixteen server computers. If one of the server computers for a tenant fails, then the load from that failed server computer can be redistributed to the other server computers allocated to that tenant. For tenants that use few server computers, providing high availability in this way is inefficient. In a worst case, a tenant using only one server computer would be allocated two server computers, resulting in no better than a fifty percent utilization of the resources allocated to that tenant, With many tenants having low utilization, allocating server computer resources for high availability in this manner results in significant inefficiencies.

To address such problems, a server computer can be quickly allocated to a tenant by, after adding the server computer to a cluster of server computers for the tenant, adding and starting copies of processes for virtual machines for the tenant. By starting copies of processes executing the virtual machine for a tenant on the server computer, the virtual machines for the tenant are rapidly made available on the newly allocated server computer for the tenant.

In one implementation, virtual machines for a tenant are added to the newly allocated server computer for the tenant by instantiating a clone, such as a linked clone or full clone, of a virtual machine from a gold image virtual machine for that tenant, called a parent virtual machine, on the server computer. Additional virtual machines for that tenant, called child virtual machines, can be created from the parent virtual machines. For example, the child virtual machines can be processes that are initially copies of the process of the parent virtual machine. As a specific example of this, a "fork" operation can be used to create a child virtual machine as an independent process that is an instant copy of a parent virtual machine.

The gold image virtual machine also has an associated gold image virtual disk, for which a replica can be stored on a data store for that tenant. The virtual machines started on a new server computer for a tenant are associated with virtual disks that are linked clones based on the gold image virtual disk, such as linked clones of the replica of the gold image virtual disk. Each virtual machine for a tenant on the new server computer is then added to the tenant computer network.

This process of adding a server computer also can be used to provide a more scalable solution for high availability for tenants with a small number of server computers. The server computers for such tenants are grouped into clusters, and use anti-affinity rules to limit instantiation of virtual machines of each tenant only on server computers for the tenant. A recovery process can be initiated after associating a backup server computer to a tenant to cause virtual machines for the tenant to be restarted on the backup server.

Using these techniques, a pool of available server computers can be shared across multiple tenants. An available server computer can be selected from this pool for a particular tenant, and then dedicated to this single tenant at runtime, thus improving utilization of the server computers while providing dedicated server computers for each tenant.

The following description refers to the accompanying drawings which form a part of this disclosure and which show, by way of illustration, example implementations. It should be understood that other implementations may be made without departing from the scope of the disclosure.

DETAILED DESCRIPTION

The following section provides an example implementation of a computer system with multiple server computers to support virtual desktops for multiple tenants.

Figure 1:
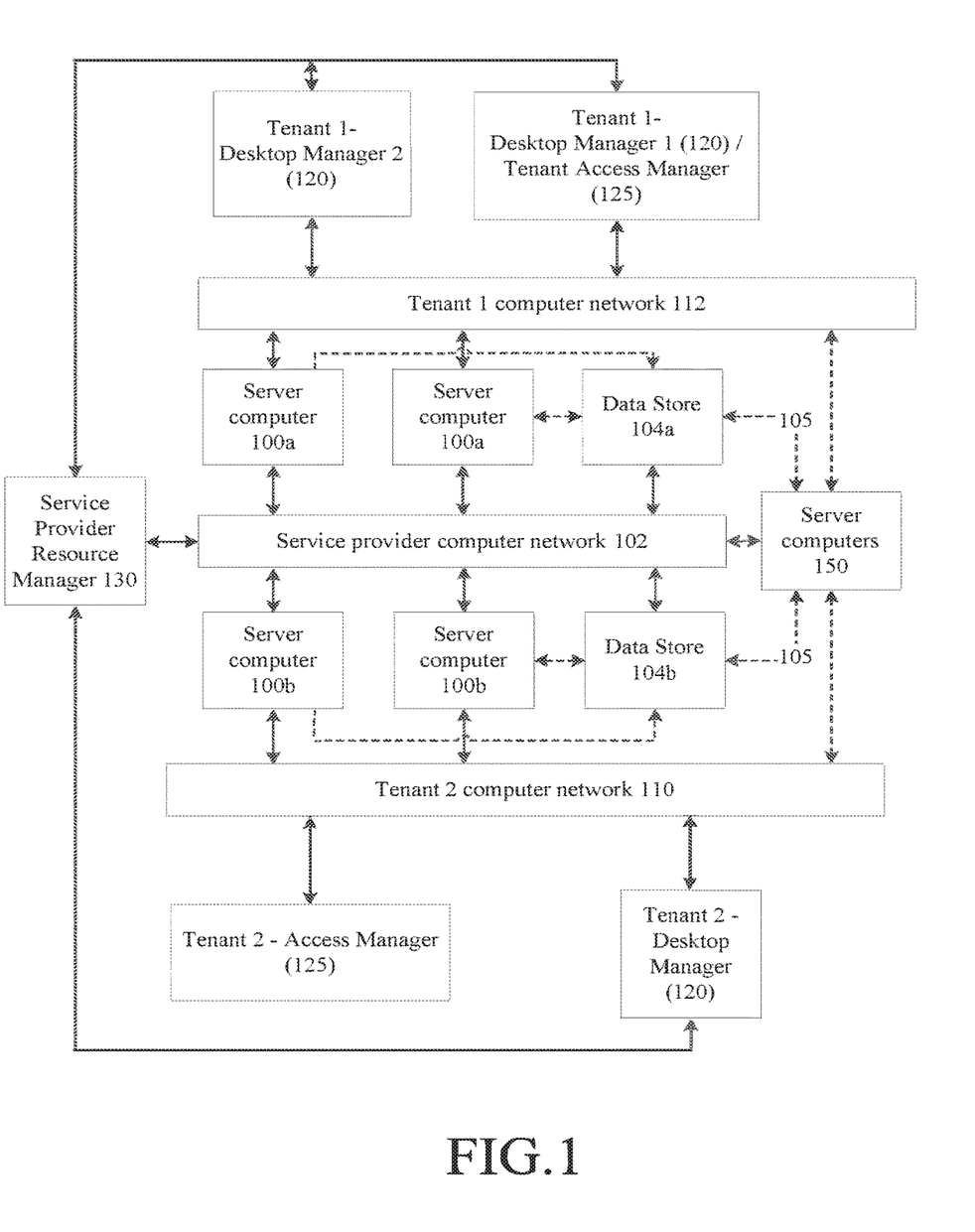
FIG. 1 is a block diagram of an example implementation of a computer system with multiple server computers to support virtual desktops for multiple tenants.
Figure 10:
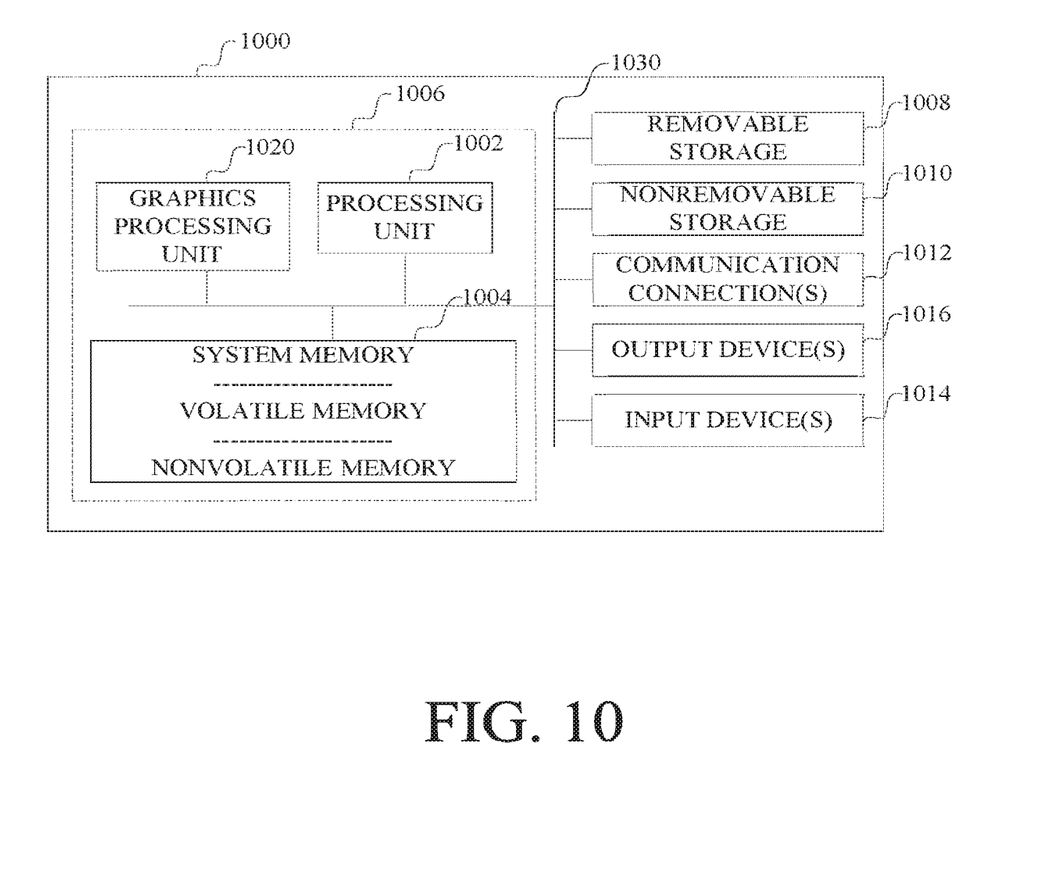
FIG. 10 is a block diagram of an example general purpose computer.

As shown in FIG. 1, a service provider has one or more geographic locations in which multiple server computers 100*a*, 100*b* and 150 are located. A server computer generally is a computer having an architecture such as shown in FIG. 10 below.

The server computers 100*a*, 100*b* and 150 are interconnected by a service provider management computer network 102, on the one hand, to allow the service provider to manage the server computers for use by tenants. A tenant typically is an enterprise, such as a corporation or other organization of multiple individuals. A connection among the server computers can be provided through a port on a network interface of each server computer to allow management access to the server computer by other computers on the service provider computer network.

The server computers 100*a* and 100*b* also are connected, on the other hand, to respective tenant computer networks 112, 110. Such a connection is provided through a separate port on the network interface of each server computer to allow virtual desktops, for the tenant for which the server computer is allocated, and which are provisioned on the server computer, to connect to a tenant computer network for that tenant. The tenant computer networks allow virtual desktops for a tenant to access that tenant's private resources, such as directory services, applications, printers and other network connected resources.

Similarly, data stores 104*a* and 104*h* indicate storage resources allocated in whole or in part to a particular tenant. Storage resources can be partitioned into separate data stores to allow storage resources to be shared among different tenants. The data stores are connected to the service provider management computer network 102 to allow the service provider to manage the devices to be configured for a particular tenant and for maintenance. The data stores also are connected to the server computers over a storage network, represented by dashed lines, of which some are labeled 105. The storage network typically has a maximum transmission unit greater than that of a typical enterprise network, such as the tenant computer network, so as to provide more efficient data transmission for interaction with a storage device. A data store is logically connected to server computers for a tenant by specifically mapping the data store to those server computers.

One or more desktop managers 120 on the tenant computer network also are established for each tenant. A desktop manager aggregates services for and information about virtual desktops available on the tenant computer network, and manages session state and allocation of virtual desktops to tenant users. A desktop manager generally is a computer having an architecture such as shown in FIG. 10 below. Multiple desktop managers can be supported by the same computer, or each desktop manager can be housed in a separate computer. At least one desktop manager is created and configured for each tenant.

The set of server computers managed by each desktop manager for a tenant are generally homogeneous, i.e., each server computer provides the same hardware resources or the same ratio of hardware resources to each virtual desktop as other server computers managed by the same desktop manager. Multiple types of server computers can be provided to support different types of workloads, each with its own desktop manager for each tenant, such as described in U.S. Patent Publication 2015/0256474, hereby incorporated by reference.

A tenant also has access to a tenant access manager computer (125). The tenant access manager computer allows a tenant to request the service provider to provision one or more virtual desktops for a pool of users, as described in more detail below. The tenant access manager computer can provide other functionality such as account management, user entitlement, user authentication and authorization, utilization reporting, and the like. After a request from a tenant user to access a virtual desktop provisioned for the user, the tenant access manager contacts the desktop manager for the tenant to obtain information about a virtual desktop to be allocated to the user. The desktop manager provides an indication of a network address and a port through which the virtual desktop can be accessed on one of the server computers for the tenant. A tenant access manager generally is a computer having an architecture such as shown in FIG. 10 below. While it is shown in FIG. 1 as a separate computer, the tenant access manager can be incorporated in a same computer as a desktop manager for the tenant.

In this illustrative example in FIG. 1, different tenants are assigned different server computers as illustrated at 100a and 100b. It is technically possible to have different tenants share resources of a server computer. However, as an example, server computer 150 is not yet connected to a tenant computer network, as it is not yet allocated to a tenant. The server computer 150 is nonetheless connected to the service provider computer network to allow the service provider to configure the server computer 150 to be allocated to one of the tenants.

Multiple server computers 150 are generally made available, from which any server computer can be allocated to any tenant among the multiple tenants, Different server computers 150 can be allocated to different tenants, in a manner to be described in more detail below in connection with an example implementation. As an example, Tenant 1 may always have at least the two server computers shown in FIG. 1 allocated to it; however, at different times during a day, additional server computers may be allocated to Tenant 1. Similarly, Tenant 2 may always have at least the two server computers shown in FIG. 1 allocated to it; however, at different times during a day, additional server computers may be allocated to Tenant 2.

A resource manager 130 allows the service provider to allocate server computers 150 to a tenant, and to configure the server computers 100a, 100b to support virtual desktops for a particular tenant, but without needing direct access to its tenants' computer networks or the virtual desktops. After a server computer 150 is allocated to a tenant, the resource manager also can receive requests, through tenant management computers, to provision virtual desktops for pools of users according to a desired desktop model. A desktop model is the data that defines the characteristics of the system resources used to support a type of workload, and can include information such as CPU, memory, storage or other resources that can differ among different server computers. Using information about the server computers associated with each desktop manager of the tenant, the resource manager allocates the virtual desktops to the server computers assigned to the tenant so as to optimize the service provider's resource utilization for that tenant. For example, the resource manager can distribute desktops relatively uniformly across the available server computers for a tenant. A resource manager generally is a computer having an architecture such as shown in FIG. 10.

In such a system, the service provider resource manager generally maintains, for each client, a list of the server computers associated with the client, and their current state, as well as a list of available, unallocated server computers. The system can maintain system load information for each tenant, indicating when additional server computers should be allocated to or deallocated from the tenant. For each tenant, the system also can maintain a list of users and information associating the user to a desktop model. The information about the desktop model can be used by the service provider to select a desktop manager, and in turn select one of the server computers allocated to the tenant, to provision and manage the virtual desktop that can be used by that user.

With such a configuration, a varying number of server computers can be allocated for a tenant over time. To do such allocation, the service provider resource manager adds and removes server computers 150 to tenant networks and maps data stores to server computers 150 in general based on demand. Such allocation can be done automatically, for example based on a schedule, based on historical capacity demand, based on measured demand, based on threshold triggers, based on server computer maintenance or failure of existing server computers, or can be done in response to manual instructions from a system administrator. The resource manager also instructs server computers that are added to a tenant network to provision a set of virtual desktops for that tenant.

While it is possible for a service provider to allocate server computers to tenants based on expected likely usage, dynamic addition or reassignment of a generic server computer to a pool of server computers configured for a particular tenant presumes an ability to quickly configure the server computer and provision virtual desktops configured for that tenant on that newly configured server computer. To do so involves installing an operating system, including a file system, and configuring that server computer on the tenant computer network (e.g., 110, 112), and mapping the server computer to the data stores e.g., 104a, 104b) for the tenant, registering the server computer with the cluster of server computers allocated to the tenant, and then provisioning multiple virtual desktops on that server computer. Many operating system and application installation procedures, as well as network registration and data store mapping, can take several hours due to, for example, rebooting the server computer several times before the server computer can be available to provide a virtual desktop that can be assigned to a particular user for that tenant. Techniques for achieving these results quickly in the context of supporting virtual desktops are described in more detail below.

In addition, in such a system, high availability of server computer resources can be provided. For example, high availability can be provided, in part, by having an additional server computer allocated for a tenant beyond that tenant's projected use. For example, if a tenant is projected to use fifteen server computers, an additional server computer can be allocated for that tenant, thus resulting in an allocation of sixteen server computers. If one of the server computers for a tenant fails, then the load from that failed server computer can be redistributed to the other server computers allocated to that tenant. For tenants that use few server computers, providing high availability through an additional server computer for each tenant is inefficient. In a worst case, a tenant using only one server computer would be allocated two server computers, resulting in no better than a fifty percent utilization of the resources allocated to that tenant. With many tenants having low utilization, allocating server computer resources for high availability in this manner results in significant inefficiencies. Techniques for improving utilization while providing high availability are described in more detail below.

Given this description of a general operation and functionality of such a computer system, a more specific example implementation will now be described, in which the problems of fast configuration of server computers can be addressed, along with how to address efficiently providing high availability.

In this example, various data is stored in data structures in data files in a storage device or in a memory within the system to maintain the information used to assign server computers to tenants.

Figure 2:
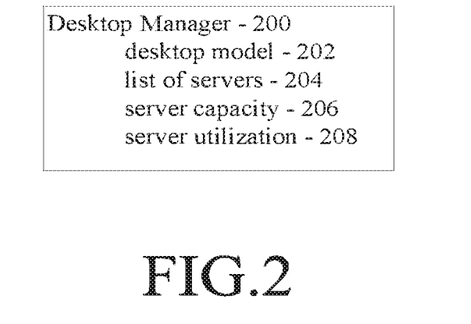
FIG. 2 is an illustration of a data structures maintained for a desktop manager.

Referring now to FIG. 2, the resource manager maintains data about each desktop manager 200 for the tenant. Thus, there may be multiple instances of the data structure 200 for each tenant, and each tenant has at least one data structure 200. The data for each desktop manager 200 for a tenant includes data describing the desktop model 202 or desktop models supported by the desktop manager, and a list 204 of server computers associated with this desktop manager. The number of server computers in the list(s) 204 of server computers for a tenant represents the number of server computers currently allocated to the tenant and may not be sufficient to support the tenant's usage if the tenant's full quota of virtual desktops were active. The desktop models supported can be defined specifically or can be inferred from specifications of the server computers. Information about the capacity 206 of each server, and current usage 208 of each server computer, also can be determined and stored by the resource manager. The data describing the current usage of a server computer can include an indication of the virtual desktops provisioned for each tenant on the server.

Figure 3:
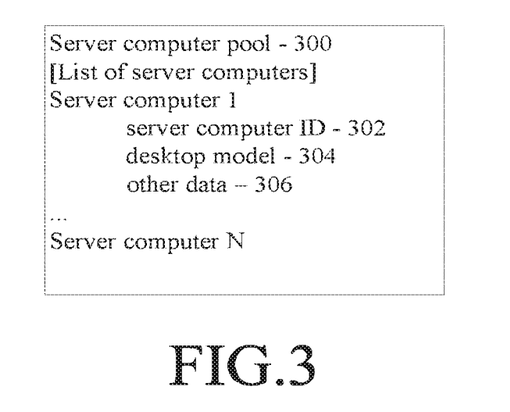
FIG. 3 is an illustration of a data structures maintained for a server computer pool.

Referring now to FIG. 3, the resource manager also maintains data about available, unallocated server computers, in a server computer list 300. This list of server computers includes, for each server computer 300, at least a server computer identifier 302, which can be, for example, a numerical identifier, a universally unique identifier (uuid) such as a BIOS id, or a network address such as a MAC address or its IP address on the service provider computer network. Data indicative of the desktop model 304 also can be stored. This data allows the resource manager to identify the desktop manager for the tenant to which this server computer is associated, if multiple desktop managers and desktop models are used. Various other data 306 also can be stored for each server computer, such as a data center or geographic location in which the server computer is located.

Figure 4:
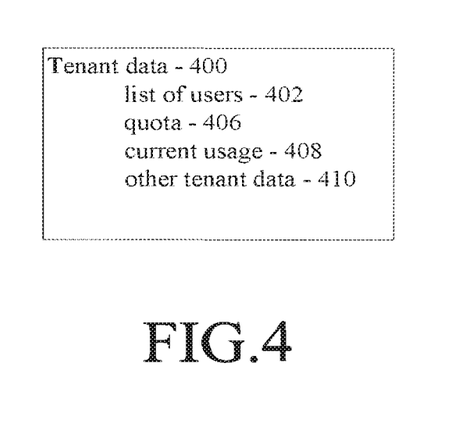
FIG. 4 is an illustration of a data structures maintained for a tenant.

Referring to FIG. 4, the resource manager also maintains or can retrieve from the tenant management services various tenant data 400 for each tenant. The tenant data can include, for example, a list 402 of users and quota data 406. Typically, a tenant purchases from a service provider access to a number of virtual desktops within each of a number of predefined desktop models, called a quota. This quota also can be stored per desktop model per desktop manager, in which case a desktop manager is queried to determine its quota and current utilization within that quota. A current number of virtual desktops actually provisioned for access by the tenant's users also can be tracked, as indicated at 408. When the tenant requests a set of virtual desktops for a pool of users to be provisioned, this quota and the current usage can be checked to determine whether the request can be fulfilled. Note that the number of servers currently allocated to a tenant may not be sufficient to support the full quota allowed for the tenant. Various other tenant data 410 can be stored such as identification information, contact information and billing information, and an indication of a gold pattern (i.e., a base copy of an executable computer program providing the virtual desktop) to be used in provisioning the virtual desktops.

These various data structures can be created, read, updated, written, deleted and stored by the service provider, and its computer systems, through the resource manager. Tenant-specific data can be updated by the service provider through the resource manager or by the tenant through the tenant desktop manager communicating with the resource manager. Both systems include computers (such as described in FIG. 10 below) configured by computer programs to provide access to the stored data. For example, the data can be made accessible through a browser application running on a computer that accesses the computer storing the data, which in turn provides an interface to the browser application that allows a user to view and enter data.

Given a system so configured as described above in connection with FIGS. 1-4, example implementations of operations of such a system, to support users from multiple tenants will now be described in connection with FIGS. 5-9.

Figure 5:
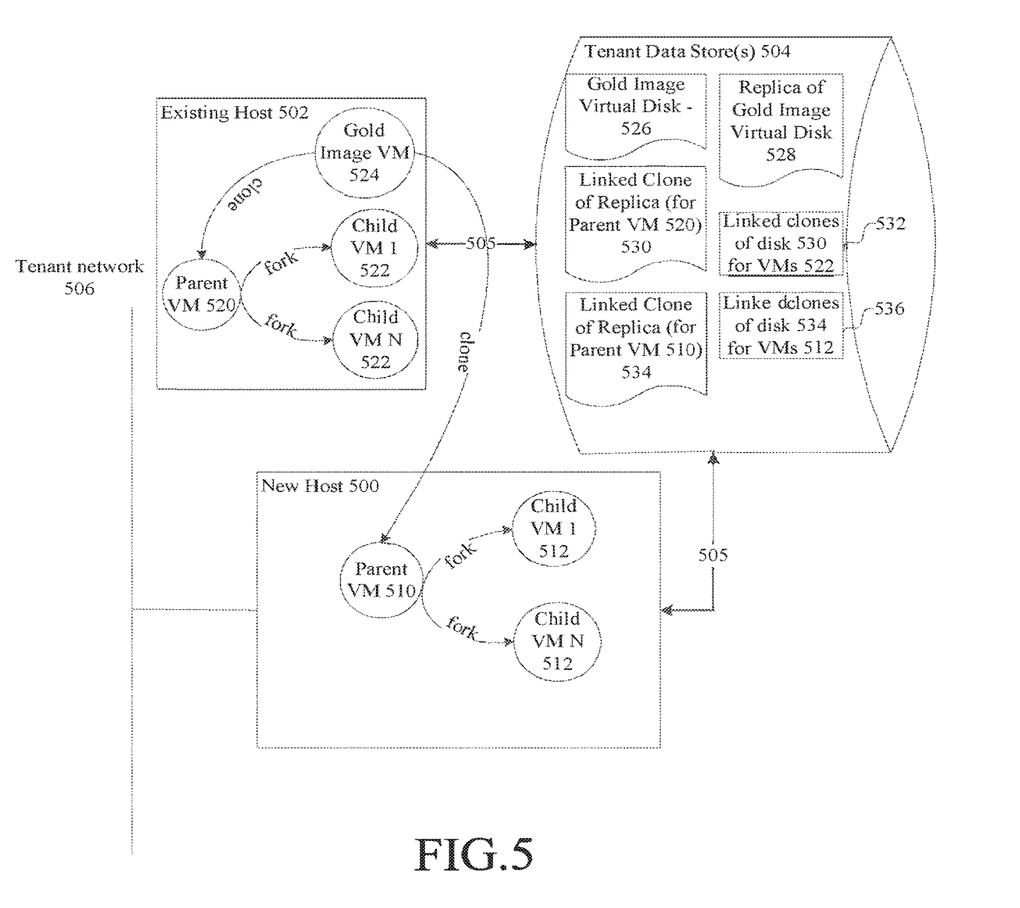
FIG. 5 is block diagram of an example implementation of a new server computer allocated for a tenant.

Referring to FIG. 5, a block diagram of an example computer system is illustrated, in which a new server computer, called the "new host" 500, is being allocated to a tenant. The tenant already has allocated to it at least one server computer, called the "existing host" 502. The tenant already has a data store 504 associated with and connected to the existing host 502 over the storage network as indicated at 505. The existing host 502 is running a parent virtual machine ("VM" 520) from which one or more child virtual machines (child VM 522) have been created. A "gold image" virtual machine ("VM" 524) is registered on the existing server computer 502. A single gold image VM can be registered on a single one of the server computers allocated to the tenant, for each type of virtual machine used by that tenant. The corresponding gold image virtual disk 526 also is stored on each data store 504 for the tenant. The parent VM 520 on existing host 502, and its virtual disk 530 on data store 504, are a clone, such as a linked clone or full clone, based on the gold image VM 524 and gold image virtual disk 526, respectively, for the tenant. In the implementation shown in FIG. 5, the parent virtual disk 530 is a linked clone of a replica 528 of the gold image virtual disk 526. The gold image VM 524 and gold image virtual disk 526 for a tenant provides a consistent initial state of a virtual machine and corresponding virtual disk for the tenant. The child VMs 522 each have an associated virtual disk 532, which, in the implementation shown in FIG. 5, have been created as a linked clone of the parent virtual disk 530. In some implementations it is possible for the child virtual disks 532 to be linked clones of the replica virtual disk 528 or of the gold image virtual disk 526.

The new host 500 is initialized with its primary operating system, typically a hypervisor that allows multiple virtual machines to be executing on the host computer. The new host 500 also is added to the tenant computer network 506, associated with a cluster of server computers for the tenant. The data store 504 also is mapped to the new host 500 over the storage network 505. In some implementations, an additional data store 504 can be allocated to the tenant and mapped to the new host 500. The multiple instances of "505" in FIG. 5 are intended to indicate different connections over the storage network.

When the new host 500 is added, a clone, such as a full clone or a linked clone, based on of the gold image virtual machine 524 for that tenant is instantiated on the new host 500. This clone can be the parent VM 510 on the new host 500. Its corresponding virtual disk 534 on the data store 504 can be a linked clone, for example, of the replica 528 of the gold image virtual disk.

Subsequently, additional virtual machines (e.g., a number that is a positive integer N) for the tenant, called "child VM 1" to "child VM N" 512, can be created on the new host 500 through an operating system operation called a "fork". Generally speaking, a fork operation creates an independent process as an instant copy of an existing process. When applied to the process that defines the entire parent virtual machine, the result is a child virtual machine that is a live copy of the parent virtual machine. An example implementation of this operation is found in U.S. Patent Publication 2016/0055016, hereby incorporated by reference. Thus, each child VM 512 is an independent process that is an instant copy of the process running for the parent VM 510.

For each child VM 512, the system creates a linked clone 536 of the virtual disk 534 of its parent VM, on the data store 504 used by the child VM. If multiple data stores 504 are used, then each data store 504 has a replica 528 of the gold image virtual machine's virtual disk 526, and the child VM's virtual disk (532, 536) is created as a linked clone of either its parent virtual disk (530, 534) or the replica (528) residing on the data store to which the child VM is mapped. By creating the virtual disk for a child VM as a linked clone of the replica virtual disk, the virtual disk is immediately available for use and copying of a substantial amount of data is avoided. Subsequently, when the child VM is running, the linked clone uses a copy-on-write technique to store any changes. Similarly, any memory pages of the child VM are references to the memory pages of the parent VM, which then become independent memory pages of the child VM using copy-on-write operations. Thus, the child VM then accesses its own linked clone 536, and any changes to the child VM are reflected only in a "delta" disk associated with that child VM, which stores the differences from between the child VM's linked clone and the replica virtual disk, while otherwise minimizing storage use for data that has no changes from the original gold image virtual disk.

Each child VM 512 also is configured with its own network address, e.g., an internee protocol (IP) address, on the tenant computer network. An "offline domain join" process can be initiated in which an access control system for the tenant computer network is informed of the identity of the guest operating system running in the client VM and through which the client VM is configured with a network address. An example implementation of this process is described in U.S. Pat. No. 9,323,565, hereby incorporated by reference.

From time to time, the utilization by a tenant of the server computers allocated to that tenant is such that a server computer is & allocated from the tenant. In such a case, one of the server computers is selected for removal and any currently used child VMs 512 are moved while still running from the host 500 to another host, e.g., host 502 in such a way that a user connected to that child VM is unaware. Moving a virtual machine from one host to another host can be implemented as described in U.S. Pat. No. 7,484,208, which is hereby incorporated by reference. A new process corresponding to the original child VM is created on the new host 502, and then all memory pages and optionally the storage of the original child VM are copied and maintained in synchronization between the old host 500 and the new host 502. When inputs and outputs for the original process quiesce, any system references to the original process are converted to refer to the new process on the new host, and the original process on the old host is terminated. After moving all child VMs off of the host 500 to the other host 502 and removing any parent VM(s) 510, then the host 500 can be deal located from the tenant, by disconnecting it (logically) from the tenant's computer network and data stores and removing it (logically) from the cluster of computer associated with that tenant. The deallocated server computer then can be used to provide computing services to other tenants.

Figure 6:
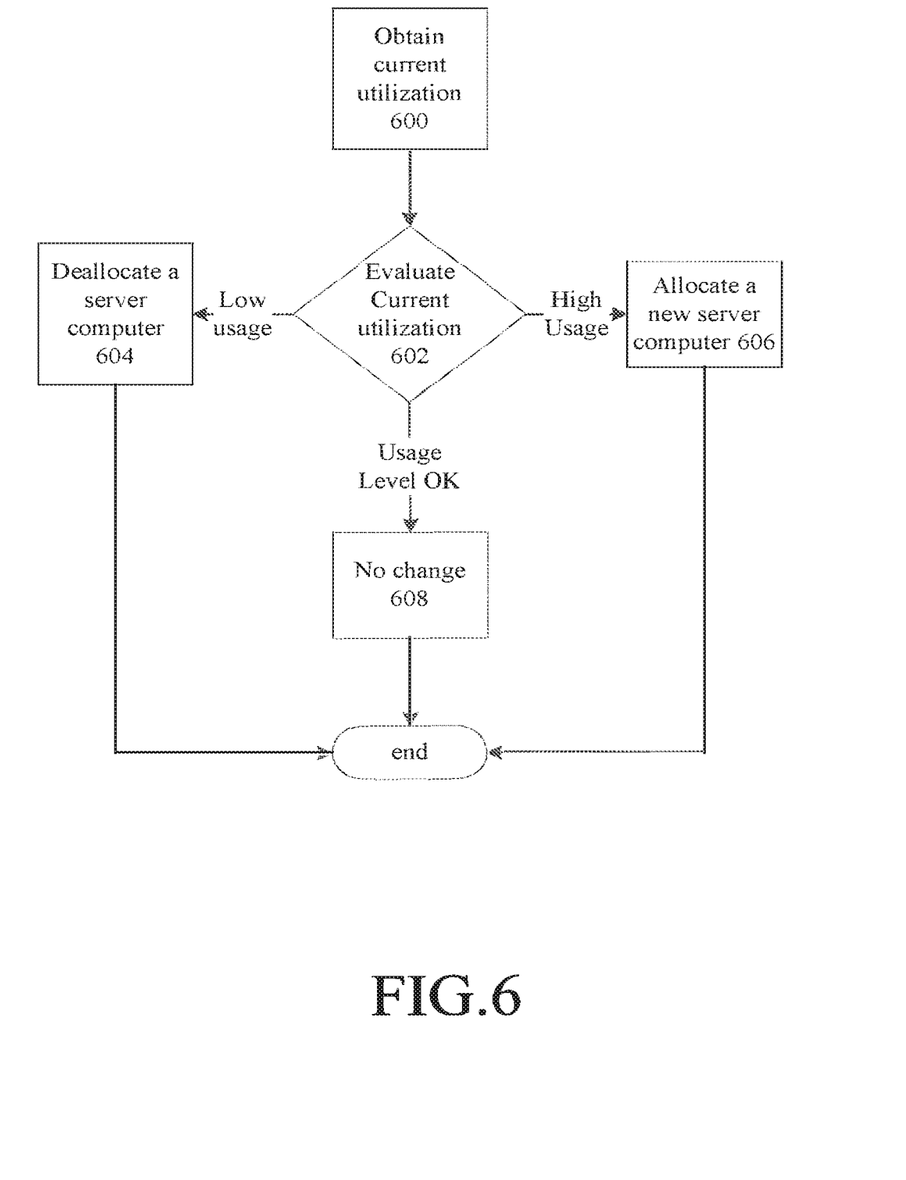
FIG. 6 is a flow chart describing an example implementation of dynamic allocation of server computers to a tenant.

Referring now to FIG. 6, an example implementation of a process of managing the allocation of server computers to a tenant is described. This example is for an implementation in which the computer system monitors utilization and periodically adjusts allocation automatically. It should be understood that FIG. 6 is merely one example of an implementation for how to determine whether to change the allocation of server computers for a tenant.

Thus, periodically, the service provider resource manager obtains 600 data describing the current utilization of the server computers allocated to a tenant. For example, data about current utilization can be obtained from the data stored in data structures shown in FIGS. 2-4. The current utilization is evaluated 602, for example by comparison to thresholds, to determine whether any change should be made to the current allocation. For example, a comparison to one or more minimum thresholds can indicate that one or more server computers are underutilized and that a server computer should be deallocated from the tenant, as indicated at 604. A comparison to one or more maximum thresholds can indicate that one or more server computers are over-utilized and that another server computer should be allocated to the tenant, as indicated at 606. An example implementation of a process for adding a server computer is described below in connection with FIG. 7. Otherwise, the service provider resource manager determines that no change is made to the allocation of server computers, as indicated at 608.

Figure 7:
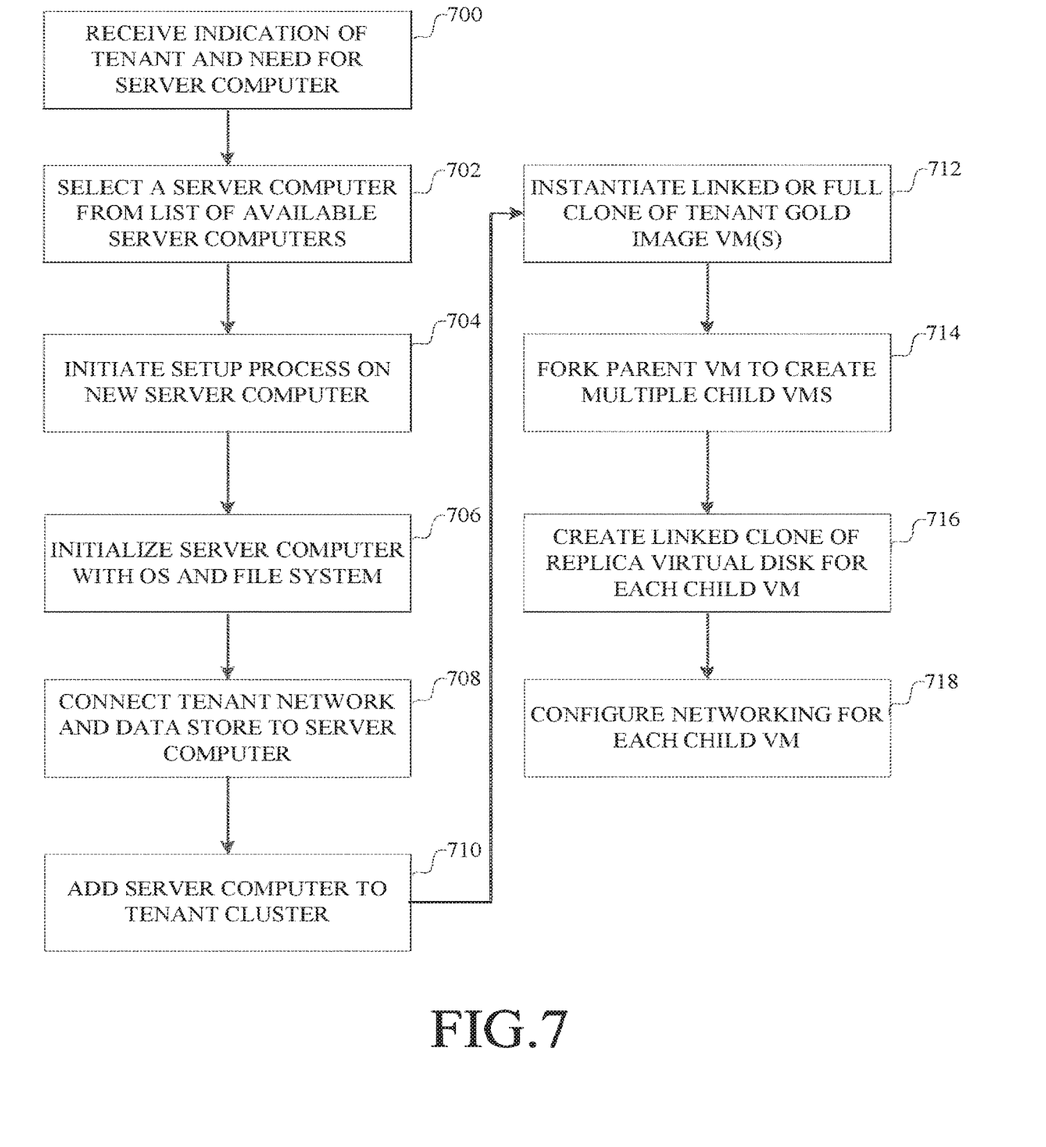
FIG. 7 is a flow chart describing how a server computer is allocated to a tenant.

Referring now to FIG. 7, an example implementation of a process of allocating a server computer to a tenant begins with the service provider resource manager receiving 700 an indication of a tenant, and the tenant's need for a server computer. The tenant's need can be specified in a number of ways. For example, the tenant's need can be pre-defined, such as by a schedule that specifies that, on a certain day and at a certain time, the resource manager adds a server computer to the set of server computers for the tenant. As another example, the tenant's need can be based on the current usage, e.g., a number of virtual desktops currently being used going over a threshold, such as described in FIG. 6 above, or the number of virtual desktops current being used coining within a specified capacity threshold of the currently assigned server computers. The tenant's need can be predicted based on a comparison of past and current usage patterns. The tenant's need can come in the form of a specific request from the tenant. The tenant's need also can come in the context of a failure or other maintenance operation, in response to which virtual desktops on a currently allocated server computer are moved to a newly allocated server computer.

The service provider resource manager selects 702 a server computer from among the available server computers, e.g., as found in a data structure such as shown in FIG. 3. This selection can be made in several ways. For example, if a desktop model and/or geographic location or data center is specified for the tenant, then the set of available server computers can be filtered to identify only those server computers that match the specified criteria. A random or pseudo-random selection, or simply selecting a first in a list, or any other form of selection of a server computer that matches the specified criteria, can be used to select the server computer.

The service provider resource manager then initiates 704 the setup process for the newly added host computer, if not previously done, the server computer is initialized 706 with an operating system and file system. The tenant computer network and optionally one or more data stores are also connected 708 to the host computer. The new server computer is added 710 to the cluster of server computers associated with the tenant.

After the new server computer is added to the cluster of server computers for the tenant, copies of processes for virtual machines for the tenant are added to the server computer and started. By starting copies of processes executing the virtual machine for a tenant on the server computer, the virtual machines for the tenant are rapidly made available on the newly allocated server computer for the tenant.

In one implementation, a copy of a virtual machine process started on the server computer is a clone, such as a linked clone or a full clone, of the gold image virtual machine(s) for that tenant is instantiated 712 on the new server computer as a parent VVI, such that the parent VM is running on the new server computer, and a replica of its virtual disk is made on each of the new data stores used by the tenant (if any were added). Child VMs for the tenant are created 714 as a fork of the parent VM process.

Other implementations can be used to add and start copies of processes for virtual machines for a tenant to a server computer which has been added to a cluster of server computers for the tenant. For example, one or more virtual machines can be instantiated on a server computer. The processes for these virtual machines can then be suspended and copies of the suspended processes can be removed from the server computer. That server computer may be removed from the cluster of server computers for that tenant. When a server computer is added back into the cluster of server computers for a tenant, the suspended processes are registered to the server computer and resumed.

After child VMs are created on the server computer, they are associated with a replica virtual disk. For example, for each child YM, the system also creates 716 a linked clone of the replica of the virtual disk for the parent VM. Each child YM also is configured 718 on to one of the tenant networks with its own network address.

Figure 8:
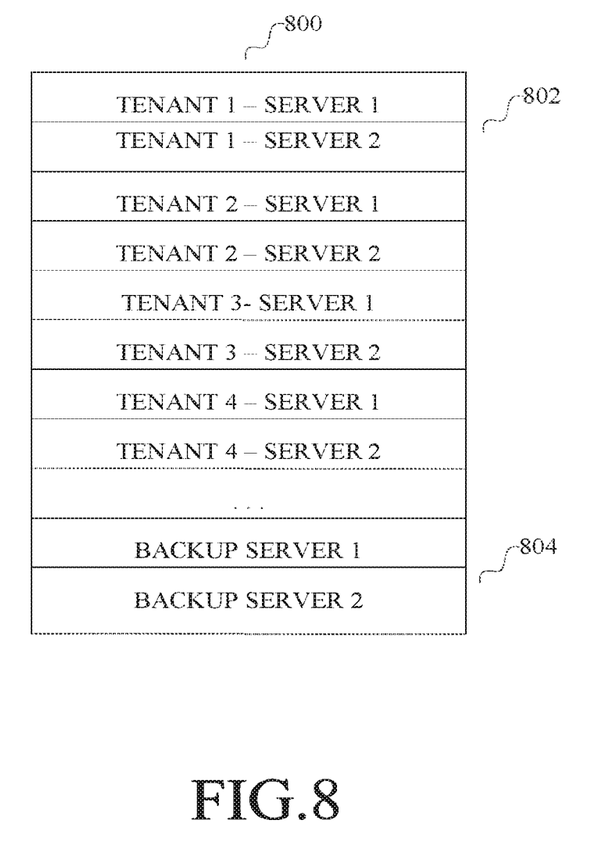
FIG. 8 is a diagram of server computers for multiple tenants organized in a cluster to share backup server computers.

Referring now to FIG. 8, an example implementation of a system is described which improves utilization of server computers while also providing high availability, where multiple tenants use a small number of server computers. In the examples described above, a tenant can be allocated a number N of server computers which corresponds to the predicted usage by the tenant, plus one. In other words, if a tenant is predicted to require N server computers to support M virtual machines, then the system allocates N+1 server computers for the tenant. The allocation of N+1 server computers can be done in clusters of server computers. That is, a tenant can have X clusters of Y server computers, for example Y may be 16 or 32 server computers per cluster, and one or more additional server computers can be allocated for the tenant within each cluster for high availability. Assuming the number of additional server computers for high availability is H, then a tenant may have N+(H*X) server computers allocated to it, which is divided into groups of Y server computers. The value of N can be adjusted from time to time as noted above. Such an allocation supports high availability because if any of the N+1 server computers fails, then sufficient capacity is available (N server computers) to support the M virtual machines for that tenant.

In such a configuration, however, for small values of N, such as N<8 and especially for N<4, such allocation can be inefficient. For example, with four tenants, each requiring three server computers and thus four server computers per tenant, a cluster of sixteen computers could be defined with four groups of four server computers. Such a cluster would realize 75% utilization.

To address and improve this utilization, as shown in FIG. 8, a single cluster 800 is defined for a group of tenants. Each tenant Ti has an allocation of Ni server computers, e.g., 802. One or two additional backup server computers 804 are designated for the group of tenants. In order to ensure minimum steps and therefore faster allocation of backup servers, the backup servers in a given cluster can have configured the networks and data stores for all tenants in the cluster.

In addition, rules, called anti-affinity rules, are applied to specify how virtual machines for different tenants within the cluster can be instantiated on the server computers within the cluster. In particular, an anti-affinity rule can be used to establish that on any given server computer, only virtual machines of one tenant can be created on that server computer. In other words, a virtual machine of a second tenant cannot be transferred to, or instantiated on, or run on, a server computer that already has one or more virtual machines of a first tenant. Thus, once a virtual machine for a tenant is instantiated on a server computer and the appropriate anti-affinity rules are applied, then only virtual machines for that tenant can be instantiated on that server computer. When a virtual machine for one tenant is to be moved to a server computer, a scheduler disqualifies any server computers having virtual machines of other tenants. A high availability recovery process, when invoked, restarts virtual machines from a failed server computer within a cluster to other server computers within that cluster abiding by the established anti-affinity rules. The backup server computers have no affinity associated with them until a virtual machine for a particular tenant is placed on that backup server with the appropriate anti-affinity rules specified.

At any given time, such as a maintenance event for a server computer for a tenant, one of the backup server computers in the cluster can be allocated to one of the tenants associated with the cluster. The setup of the server computer can be performed in a manner analogous to the addition of a server computer to the tenant as described above in connection with FIGS. 5 to 7. Subsequently, due to the anti-affinity rules and the high availability recovery process, virtual machines can be moved from one server computer to another.

Figure 9:
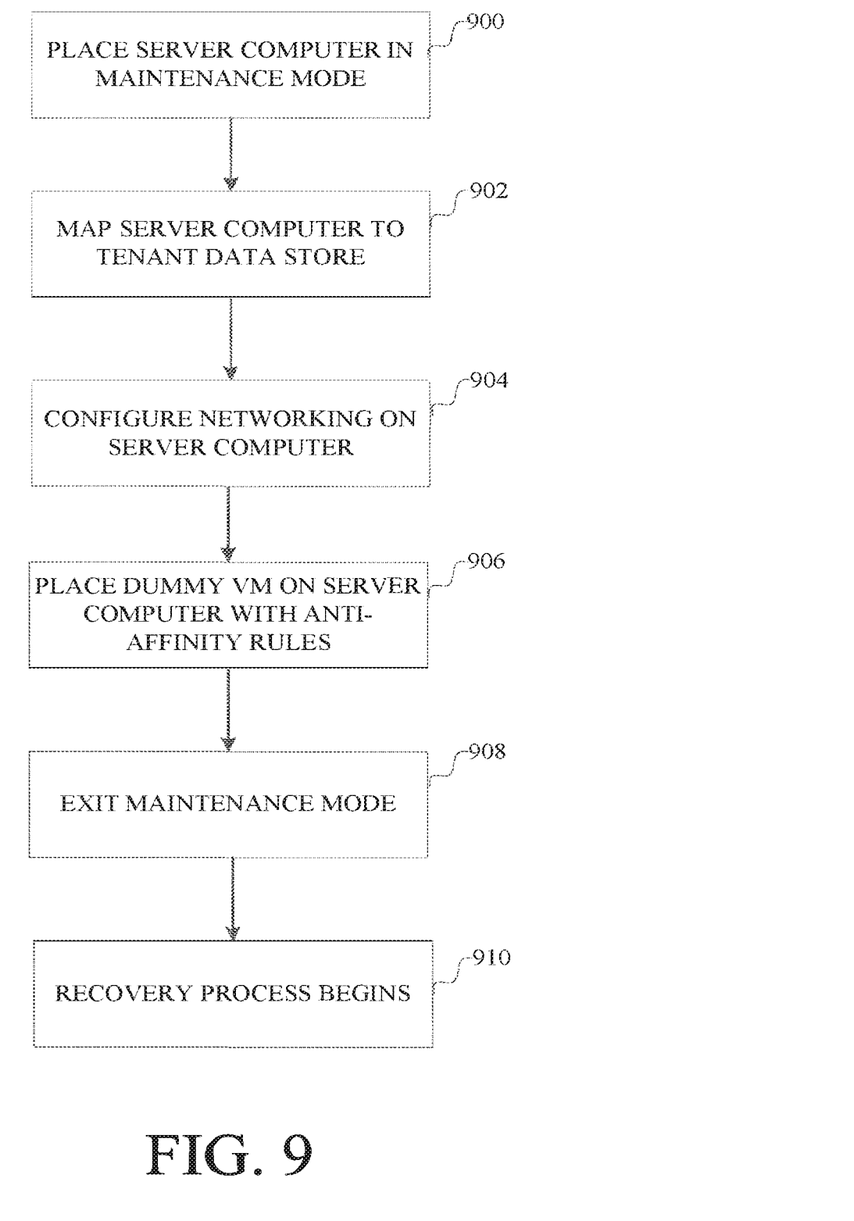
FIG. 9 is a flow chart describing how a backup server computer is allocated to a tenant.

Turning now to FIG. 9, a flowchart describing an example implementation of a process for supporting high availability will now be described.

The server computer to be added for a tenant is placed 900 in a maintenance mode. In this mode it is mapped 902 to the tenant's data store, and configured 904 to the tenant's computer network. A placeholder virtual machine for the tenant is then registered 906 on the server computer. The server computer is then removed 908 from maintenance mode, and a high availability recovery process is initiated 910. Due to the anti-affinity rules, the placeholder virtual machine for the tenant that is registered on this server computer in essence reserves this server computer for use by this tenant, because the high availability recovery process cannot place virtual machines for other tenants on this server computer. Other techniques can be used to ensure that a newly added server computer can be reserved for use by the particularly tenant.

The computer system as described above allows a service provider to improve utilization of server computers based on actual usage of those server computers by tenants, by allowing the allocation of server computers to be more responsive to changes in demand or utilization. In particular, to address conditions limiting simultaneous use of a server computer by multiple tenants, a computer system is provided in which tenants can share a server computer in a way in which the server computer is dedicated to a single tenant at any given point in time. Further, high availability can be more efficiently supported by having backup server computers for multiple tenants to be drawn from a shared set of backup server computers.

FIG. 10 illustrates an example computer with which various components of the system described above can be implemented. The computer illustrated in FIG. 10 is only one example of general purpose computer and is not intended to suggest any limitation as to the scope of use or functionality of such a computer.

With reference to FIG. 10, an example computer includes at least one processing unit 1002 and memory 1004. The computer can have multiple processing units 1002. A processing unit 1002 can include one or more processing cores (not shown) that operate independently of each other. Additional co-processing units, such as graphics processing unit 1020, also can be present in the computer. The memory 1004 may be volatile memory (such as dynamic random access memory (DRAM) or static random access memory (SRAM), etc.), or non-volatile memory (such as a form of programmable read only memory (PROM), flash memory, etc.) or some combination of the two. The memory can include system memory devices separate from the processing units 1002 and 1020 and registers and other storage located within the processing units 1002 and 1020. This configuration is illustrated in FIG. 10 by dashed line 1006. The computer 1000 may include additional storage (removable and/or non-removable) including, but not limited to, magnetic or optical disks or tape. Such additional storage is illustrated in FIG. 10 by removable storage 1008 and non-removable storage 1010.

A computer storage medium is any medium in which data can be stored in and retrieved from addressable physical storage locations by the computer. Computer storage media includes volatile and nonvolatile, removable and non-removable media, Memory 1004, removable storage 1008 and non-removable storage 1010 are all examples of computer storage media. Some examples of computer storage media are DRAM, SRAM, PROM, flash memory or other memory technology, CD-ROM, digital versatile disks (DVD) or other optically or magneto-optically recorded storage device, magnetic cassettes, magnetic tape, magnetic disk storage or other magnetic storage devices. Computer storage media and communication media are mutually exclusive categories of media.

The computer 1000 also may include communications connection(s) 1012 that allow the computer to communicate with other devices over a communication medium. Communication media typically transmit computer program instructions, data structures, program modules or other data over a wired or wireless substance by propagating a modulated data signal such as a carrier wave or other transport mechanism over the substance. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Communications connections 1012 are devices, such as a network interface or radio transmitter, that interface with the communication media to transmit data over and receive data from communication media. Communication media and signals are mutually exclusive of computer storage media.

Computing machine 1000 may have various input device (s) 1014 such as a keyboard, mouse, pen, camera, touch input device, and so on. Output device(s) 1016 such as a display, speakers, a printer, and so on may also be included. All of these devices are well known in the art and need not be discussed at length here.

The various components in FIG. 10 are generally interconnected by an interconnection mechanism, such as one or more buses 1030.

Each component of the system as described herein which operates using a computer can be implemented by a computer that is configured by one or more computer programs being processed by one or more processing units in the computer. A computer program includes computer-executable instructions and/or computer-interpreted instructions, such as program modules, which instructions are processed by one or more processing units in the computer. Generally, such instructions define routines, programs, objects, components, data structures, and so on, that, when processed by a processing unit, instruct the processing unit to perform operations on data or configure the computer to include various devices or data structures. This computer system may be practiced in distributed computing environments where tasks are performed by remote computers that are linked through a communications network. In a distributed computing environment, computer programs may be located in both local and remote computer storage media. The computer can be made highly available using conventional techniques in which computer hardware may be duplicated and includes fail over operations.

It should be understood that the subject matter defined in the appended claims is Trot necessarily limited to the specific implementations described above. The specific implementations described above are disclosed as examples only.

What is claimed is:

1. A method comprising:
   determining that an additional server computer is to be dynamically allocated to a tenant, for hosting additional virtual desktops for the tenant, based on a current utilization of server computers currently allocated to the tenant and a specified maximum threshold utilization; and
   selecting the additional server computer from among a plurality of server computers;
   wherein allocating the additional server computer comprises:
      adding the selected server computer to a cluster of server computers associated with the tenant and connecting a tenant computer network and a tenant data store to the selected server computer;

instantiating, as a tenant virtual machine, a parent virtual machine based on a gold image virtual machine for the tenant on the selected server computer, wherein the gold image virtual machine is hosted by a currently allocated server for the tenant;

associating the tenant virtual machine with one or more child virtual machines; and adding the one or more child virtual machines to the tenant computer network of the tenant.

2. The method of claim 1, wherein selecting the additional server computer comprises:

filtering the plurality of server computers based on a desktop model of the tenant to identify a set of available server computers that satisfy criteria specified by the desktop model; and selecting the server computer from the filtered set.

3. The method of claim 1, further comprising:

associating each child virtual machine with a respective one or more virtual disks, wherein each of the one or more virtual disks are generated as a respective linked clone based on a gold image virtual disk.

4. The method of claim 1, wherein each of the child virtual machines are generated as a fork of the parent virtual machine instantiated on the selected server computer.

5. The method of claim 1, further comprising:

placing the selected server computer to be added in a maintenance mode;

mapping the server computer to the data store of the tenant;

registering a placeholder virtual machine for the tenant on the selected server computer; and removing the selected server computer from maintenance mode and initiating a recovery process, wherein the placeholder virtual machine and the anti-affinity rules reserve the server computer for use by the tenant by preventing the recovery process from placing virtual machines for other tenants on the server computer.

6. The method of claim 1, wherein the plurality of server computers belong to a cluster of server computers defined for a group of tenants, wherein each tenant has a respective allocation of server computers and wherein the cluster further contains a set of one or more backup server computers available for dynamic allocation to any one of the group of tenants.

7. The method of claim 1, further comprising:

periodically obtaining data describing a new current utilization of the server computers allocated to the tenant and evaluating the new current utilization based on one or more minimum thresholds; and in response to the evaluating, deallocating one or more server computers from the tenant.

8. A system comprising:

a plurality of server computers interconnected on a service provider computer network, each server computer comprising computing resources, including one or more processing units and memory, configured to support a plurality of virtual desktops utilizing the computing resources; and a service provider resource manager configured to perform operations comprising:

determining that an additional server computer is to be dynamically allocated to a tenant, for hosting additional virtual desktops for the tenant, based on a current utilization of server computers currently allocated to the tenant and a specified maximum threshold utilization; and selecting the additional server computer from among a plurality of server computers;

wherein allocating the additional server computer comprises:

adding the selected server computer to a cluster of server computers associated with the tenant and connecting a tenant computer network and a tenant data store to the selected server computer;

instantiating, as a tenant virtual machine, a parent virtual machine based on a gold image virtual machine for the tenant on the selected server computer, wherein the gold image virtual machine is hosted by a currently allocated server for the tenant;

associating the tenant virtual machine with one or more child virtual machines; and adding the one or more child virtual machines to the tenant computer network of the tenant.

9. The system of claim 8, wherein selecting the additional server computer comprises:

filtering the plurality of server computers based on a desktop model of the tenant to identify a set of available server computers that satisfy criteria specified by the desktop model; and selecting the server computer from the filtered set.

10. The system of claim 8, wherein the service provider resource manager is further configured to perform operations comprising:

associating each child virtual machine with a respective one or more virtual disks, wherein each of the one or more virtual disks are generated as a respective linked clone based on a gold image virtual disk.

11. The system of claim 8, wherein each of the child virtual machines are generated as a fork of the parent virtual machine instantiated on the selected server computer.

12. The system of claim 8, wherein the service provider resource manager is further configured to perform operations comprising:

placing the selected server computer to be added in a maintenance mode;

mapping the server computer to the data store of the tenant;

registering a placeholder virtual machine for the tenant on the selected server computer; and removing the selected server computer from maintenance mode and initiating a recovery process, wherein the placeholder virtual machine and the anti-affinity rules reserve the server computer for use by the tenant by preventing the recovery process from placing virtual machines for other tenants on the server computer.

13. The system of claim 8, wherein the plurality of server computers belong to a cluster of server computers defined for a group of tenants, wherein each tenant has a respective allocation of server computers and wherein the cluster further contains a set of one or more backup server computers available for dynamic allocation to any one of the group of tenants.

14. The system of claim 8, wherein the service provider resource manager is further configured to perform operations comprising:

periodically obtaining data describing a new current utilization of the server computers allocated to the tenant and evaluating the new current utilization based on one or more minimum thresholds; and in response to the evaluating, deallocating one or more server computers from the tenant.

15. One or more non-transitory computer storage media comprising computer program instructions that when executed by one or computers causes the one or more computers to perform operations comprising:
determining that an additional server computer is to be dynamically allocated to a tenant, for hosting additional virtual desktops for the tenant, based on a current utilization of server computers currently allocated to the tenant and a specified maximum threshold utilization; and
selecting the additional server computer from among a plurality of server computers;
wherein allocating the additional server computer comprises:
adding the selected server computer to a cluster of server computers associated with the tenant and connecting a tenant computer network and a tenant data store to the selected server computer;
instantiating, as a tenant virtual machine, a parent virtual machine based on a gold image virtual machine for the tenant on the selected server computer, wherein the gold image virtual machine is hosted by a currently allocated server for the tenant;
associating the tenant virtual machine with one or more child virtual machines; and
adding the one or more child virtual machines to the tenant computer network of the tenant.

16. The non-transitory computer storage media of claim 15, wherein selecting the additional server computer comprises:
filtering the plurality of server computers based on a desktop model of the tenant to identify a set of available server computers that satisfy criteria specified by the desktop model; and
selecting the server computer from the filtered set.

17. The non-transitory computer storage media of claim 15, wherein the computer program instructions, when executed, further perform operations comprising:
associating each child virtual machine with a respective one or more virtual disks, wherein each of the one or more virtual disks are generated as a respective linked clone based on a gold image virtual disk.

18. The non-transitory computer storage media of claim 15, wherein each of the child virtual machines are generated as a fork of the parent virtual machine instantiated on the selected server computer.

19. The non-transitory computer storage media of claim 15, wherein the computer program instructions, when executed, further perform operations comprising:
placing the selected server computer to be added in a maintenance mode;
mapping the server computer to the data store of the tenant;
registering a placeholder virtual machine for the tenant on the selected server computer; and
removing the selected server computer from maintenance mode and initiating a recovery process, wherein the placeholder virtual machine and the anti-affinity rules reserve the server computer for use by the tenant by preventing the recovery process from placing virtual machines for other tenants on the server computer.

20. The non-transitory computer storage media of claim 15, wherein the plurality of server computers belong to a cluster of server computers defined for a group of tenants, wherein each tenant has a respective allocation of server computers and wherein the cluster further contains a set of one or more backup server computers available for dynamic allocation to any one of the group of tenants.

21. The non-transitory computer storage media of claim 15, wherein the computer program instructions, when executed, further perform operations comprising:
periodically obtaining data describing a new current utilization of the server computers allocated to the tenant and evaluating the new current utilization based on one or more minimum thresholds; and
in response to the evaluating, deallocating one or more server computers from the tenant.

\* \* \* \* \*